US009922529B2

(12) United States Patent
Thorpe et al.

(10) Patent No.: US 9,922,529 B2
(45) Date of Patent: Mar. 20, 2018

(54) REMOTE MANAGEMENT OF ELECTRONIC AND ELECTRICAL DEVICES

(71) Applicant: FIRE AVERT, LLC, Provo, UT (US)

(72) Inventors: Peter Thorpe, Lehi, UT (US); F. Wesley Clark, II, Saratoga Springs, UT (US)

(73) Assignee: FIRE AVERT, LLC., Provo, UT (US)

( * ) Notice: Subject to any disclaimer, the term of this patent is extended or adjusted under 35 U.S.C. 154(b) by 99 days.

(21) Appl. No.: 15/060,827

(22) Filed: Mar. 4, 2016

(65) Prior Publication Data

US 2016/0260313 A1 Sep. 8, 2016

Related U.S. Application Data

(60) Provisional application No. 62/128,684, filed on Mar. 5, 2015.

(51) Int. Cl.
| | |
|---|---|
| G08B 29/00 | (2006.01) |
| G08B 21/24 | (2006.01) |
| H04W 4/02 | (2018.01) |
| H04L 29/08 | (2006.01) |
| H04L 12/28 | (2006.01) |
| H01H 9/54 | (2006.01) |
| G08B 25/08 | (2006.01) |

(52) U.S. Cl.
CPC ............ *G08B 21/24* (2013.01); *G08B 25/08* (2013.01); *H01H 9/54* (2013.01); *H04L 12/2827* (2013.01); *H04L 67/125* (2013.01); *H04W 4/021* (2013.01); *H04L 2012/2841* (2013.01)

(58) Field of Classification Search
CPC .......... G08B 21/24; G08B 25/08; H01H 9/54; H04L 12/2827; H04L 67/125; H04W 4/021
USPC .......................................................... 340/506
See application file for complete search history.

(56) References Cited

U.S. PATENT DOCUMENTS

| | | | |
|---|---|---|---|
| 2006/0187034 A1* | 8/2006 | Styers | G05B 9/02 340/545.1 |
| 2016/0218884 A1* | 7/2016 | Ebrom | D06F 33/02 |
| 2017/0085393 A1* | 3/2017 | Tobella | H04L 12/2818 |

* cited by examiner

*Primary Examiner* — Ojiako Nwugo
(74) *Attorney, Agent, or Firm* — Workman Nydegger

(57) ABSTRACT

Embodiments are directed to methods and apparatuses for remotely managing electrical devices. In one scenario, a computer system performs a method for remotely managing electrical devices. The method includes determining that an electrical device has been left turned on for a threshold minimum period of time. The method next includes determining that a first device management criteria has been met indicating that the electrical device is no longer being actively managed. The method then includes notifying a user that the electrical device is still turned on, receiving an indication that the electrical device is to be turned off, and turning the electrical device off. Other scenarios include an electronic device that allows remote management of electrical devices.

12 Claims, 7 Drawing Sheets

REMOTE MANAGEMENT OF ELECTRONIC AND ELECTRICAL DEVICES

CROSS-REFERENCE TO RELATED APPLICATIONS

This application claims priority to and the benefit of U.S. Provisional Patent App. No. 62/128,684, entitled "Remote Management of Electronic and Electrical Devices, filed on Mar. 5, 2015, which application is incorporated by reference herein in its entirety.

BACKGROUND

Each year, many homes and apartments are destroyed by fire. Most of these residences have smoke alarms which allow the residents to escape before suffering bodily harm. Smoke alarms are unifunctional devices that monitor for smoke and then sound an alarm upon detecting a threshold amount. These devices do nothing to prevent fires from starting in the first place.

BRIEF SUMMARY

Embodiments described herein are directed to methods and apparatuses for remotely managing electrical devices. In one embodiment, a computer system performs a method for remotely managing electrical devices. The method includes determining that an electrical device has been left turned on for a threshold minimum period of time. The method next includes determining that a first device management criteria has been met indicating that the electrical device is no longer being actively managed. The method then includes notifying a user that the electrical device is still turned on, receiving an indication that the electrical device is to be turned off, and turning the electrical device off.

In another embodiment, an electronic device is provided. The electronic device includes a microphone configured to listen for an alarm signal. The electronic device also includes a communications module configured to send notifications to users regarding use of an electrical device and receive indications from users regarding management of the electrical device. The electronic device further includes a switch that connects or disconnects power to the electrical device, an electronic controller that controls the switch to connect or disconnect power to the electrical device, and a processor configured to analyze input signals and determine when to indicate to the electronic controller that the electrical device is to be turned off.

In yet another embodiment, a method for determining the state of an alarm device is provided. The method includes initiating a microphone to listen for a specified sound, where the specified sound indicates that the alarm device is in a specified alarm state. The method also includes determining that the specified sound has been emitted by the alarm device at least once, and then notifying at least one user that the alarm device is in the specified state. This allows the user to take action to change the state of the alarm device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
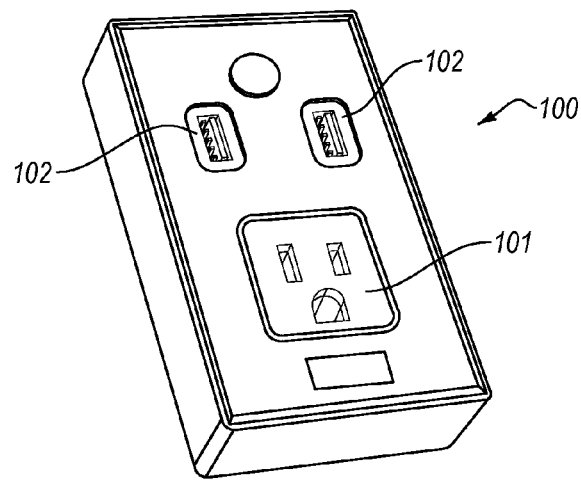
FIG. 1 illustrates a perspective view of an electronic device that is configured to remotely manage electrical devices.

At least some of the embodiments described herein implement or comprise a computing system. This computing system may be as simple as a single processor or microcontroller, or may involve a full distributed computing system (such as a cloud computing system), or anywhere in between. Indeed, in some embodiments, the computing system may be configured to generate notifications and communicate with users regarding the use of certain electrical or electronic devices, or the use of utilities such as electrical, gas, or water devices or systems. These electrical or electronic devices may comprise any type of device that runs on electricity or implements electronic components of any kind. The utilities may similarly be regulated using electrical or electrically switched devices. The computer system (or modules thereof) may be configured to monitor the usage of these devices by monitoring current usage, by monitoring device states, or by monitoring input interfaces that control the devices.

Embodiments described herein are directed to methods and apparatuses for remotely managing electrical devices. In one embodiment, a computer system performs a method for remotely managing electrical devices. The method includes determining that an electrical device has been left turned on for a threshold minimum period of time. The method next includes determining that a first device management criteria has been met indicating that the electrical device is no longer being actively managed. The method then includes notifying a user that the electrical device is still turned on, receiving an indication that the electrical device is to be turned off, and turning the electrical device off.

In another embodiment, an electronic device is provided. The electronic device includes a microphone configured to listen for an alarm signal. The electronic device also includes a communications module configured to send notifications to users regarding use of an electrical device and receive indications from users regarding management of the electrical device. The electronic device further includes a switch that connects or disconnects power to the electrical device, an electronic controller that controls the switch to connect or disconnect power to the electrical device, and a processor configured to analyze input signals and determine when to indicate to the electronic controller that the electrical device is to be turned off.

In yet another embodiment, a method for determining the state of an alarm device is provided. The method includes initiating a microphone to listen for a specified sound, where the specified sound indicates that the alarm device is in a specified alarm state. The method also includes determining that the specified sound has been emitted by the alarm device at least once, and then notifying at least one user that the alarm device is in the specified state. This allows the user to take action to change the state of the alarm device.

Embodiments described herein may implement various types of computing systems. These computing systems are now increasingly taking a wide variety of forms. Computing systems may, for example, be handheld devices such as smartphones or feature phones, appliances, laptop computers, wearable devices, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Computing systems typically include at least one processing unit and memory. The memory may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory of the computing system. Computing system may also contain communication channels that allow the computing system to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory. The system memory may also be referred to as "main memory", and includes memory locations that are addressable by the at least one processing unit over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

In some cases, the computer system may include a communications module that communicates with other computing systems. The communications module may include any wired or wireless communication means that can receive and/or transmit data to or from other computing systems. The communications module may be configured to interact with databases, mobile computing devices (such as mobile phones or tablets), embedded or other types of computing systems.

The Figures describe devices, systems, architectures and methods for remotely managing electrical devices or other types of devices. In one embodiment, the electrical devices that are managed may include devices or systems that control utilities such as electrical, gas, or water. Methods described herein may include determining that an electrical device has been left on for a specified period of time. The period of time is configurable and may be different for each device. For instance, some devices like stoves may of greater concern than other devices such as televisions or gaming consoles. As such, the period of time may be greater or smaller depending on which device is being monitored.

The method may also include determining that a device management criteria has been met indicating that the electrical device is no longer being actively managed. These criteria may include a variety of things including determining that the user has left their house, or is still at the house and is asleep and has forgotten that the device has been left on. For instance, if a user has left his or her house and is a reasonable distance away, it may be assumed that the user has left a particular device on (such as a stove) without intending to leave it on. In some embodiments, a geofence may be established around a user's house and, if the user leaves that geofence, various actions may be taken including notifying one or more users or automatically shutting the device off. The geofence may be established using GPS latitude and longitude coordinates, such that if one of the user's mobile devices (such as a laptop, cell phone, tablet or wearable device) is reporting a location outside of the geofence, then the user is assumed to have left his or her house.

The geofence itself may be a configurable size, and may be different size for each user. In some cases, the geofence may be established using a beacon that communicates with a mobile device. Then, once that mobile device is out of range of the beacon (e.g. a Wifi beacon), the device management criteria has been met and the user is assumed to have left the house. Still further, a user's mobile device may be used to determine where the user is located within the house. If the user is in his or her bedroom for a specified amount of time and a device such as a stove has been left on, the devices and computer systems described herein may determine that the user is taking a nap or is otherwise no longer actively managing the electrical device. The computer system may also be communicatively connected to a home security system or home automation system. Such systems may also have means of detecting users' presence within the home and the location of such users. This data may also be used to determine when to turn a device off on the user's behalf.

Furthermore, a combination of sensors and/or computer algorithms may be used to establish the geo fence. For example, a speaker and a microphone may be used (either in the electrical device or thru a network or security system interface) to establish a time and spatial based geofence by detecting ongoing human audible interaction with the devices. In some cases, after a configurable variable time interval (e.g. 5, 10, 15 minutes, etc.), the devices/system may issue an audible question or series of questions that are intended to elicit a response from a user.

If a primary user leaves or is in the act of leaving the premises, the device/system may ask if the user is aware that a particular device/system is on and if it should be shut off since the user is leaving. If the answer is affirmative, the device/system should shut down. If answer is negative, then the device may ask for an expected time of return. If the user hasn't returned by the expected time, the device/system can execute one of several commands including, but not limited to, notifying the person via communication/electronic devices such as wearable device, cellular phone, wireless device, etc., notifying another designated person, notifying a monitoring or security service, sounding an audial/visual alarm, or shutting off the device or system.

Thus after determining that a device management criterion has been met (and hence that the device or system (e.g. a utility system) is no longer being actively managed), the method may include notifying a user that the electrical device or system is still turned on. The notification may be sent to any mobile device including a laptop, tablet, smartphone, wearable device or other mobile computing device. The notification may be configurably sent to any user or subset of users, depending on the type of notification or depending on the type of device that was left on, or depending on how long the device has been left on. For instance, the notification may be sent to one or more residents of the house or other specified users such as family members or caregivers.

The method may also include receiving an indication that the electrical device is to be turned off, and then turning the electrical device off. As indicated above, the computer system carrying out the method may receive such indications with its communications module. The indications may come from a resident or other user. The indication may state that the device is to be shut off immediately or after a specified amount of time has passed. This amount of time may be provided by the user, or may be a default time that applies automatically. The computer system may communicate with a microcontroller that actuates a switch to cut power to the device. Additionally or alternatively, the microcontroller may be coupled to a solenoid, thermocouple, valve or other electronically-actuated device that controls flow of water, gas or electricity.

Thus, in this manner, a computing system may be used to manage electronic or electrical, gas or water controlling devices within a residence or other type of building. When devices have been turned on for a specified amount of time, the computing system may determine that the device was likely forgotten and should be turned off. The computer system may, for instance, determine that the user has left their home. The communications module of the computer system may communicate with the user's smartphone, for example, to determine the location of the phone. If the phone leaves the established geofence for that user, the computer system may notify the user using a text message, push notification, email, phone call, audible tone or signal or any other means of indicating to the user that one or more devices have been left turned on.

In some cases, the geofence is triggered automatically when the user's smartphone is a specified distance away from the house. This causes the notification to be sent to the owner (and any other users that are to be notified) indicating which device has been left on. The notification may also indicate how long the device has been on and may provide a prompt that allows the owner or other user to turn the device off. In some cases, the notification is only sent if the user is outside of the geofence for a specified period of time. For instance, if a user is only briefly outside of the geofence and comes back within the geofence, it may be assumed that the user is heading home and that no notification needs to be sent. Alternatively, if the user has been outside of the geofence for a long time, or is sufficiently far away from their house, it may be assumed that the device is no longer being actively managed.

As mentioned above, when a user responds to such a notification and indicates that a device is to be turned off, the computing system may send a signal to a controller that turns off the device. In some cases, the controller may be electrically connected to a breaker box. As such, the controller may be configured to shut off power to the device at the breaker box. Alternatively, the controller may be situated between the device and the power source (such as wall outlet) so as to cut power by disallowing it to flow from the power source to the electrical device.

In another embodiment, device use may be monitored regardless of whether the device is ultimately turned off or not. For example, a computer system may be configured to monitor how long a given electrical device has been turned on. Parents, for instance, may wish to know how long a gaming console has been turned on, or wish to know, on average, how long the television is turned on each day. The computing system may be configured to track the length of time that current is flowing to the device and store activity logs in a (local or remote) data store. In some cases, the computing system may be configured to notify one or more users when a given device has been turned on for a specified amount of time.

Thus, in one example, if a gaming console has been turned on for over one hour, a notification may be sent to a parent. Similarly, notifications may be sent if a device that is supposed to be on suddenly stops drawing current. For example, a refrigerator or freezer that is to be on continuously may be unplugged or may fail in some manner. As such, users may be notified in the case of such an occurrence. The notification may be sent to a mobile device and may indicate which device is on or off and how long it has been on or off, as the case may be.

In another embodiment, an electronic device is provided which includes a microphone configured to listen for an alarm signal. The device further includes a communications module configured to send notifications to users regarding use of an electrical device and to receive indications from users regarding management of the electrical device. The electronic device also includes a switch that cuts off or allows power to the electrical device, an electronic controller that controls the switch to cut off or allow power to the electrical device, and a processor configured to analyze input signals and determine when to indicate to the electronic controller that the electrical device is to be turned off.

The electronic device may use the microphone to listen for alarm signals. In some cases, the electronic device listens for signals that are specific to a smoke or carbon monoxide alarm and, upon detecting such a signal, automatically turns off one or more devices it is connected to. In some embodiments, the electronic device may sit between a device and its power source. Upon hearing the alarm, the electronic controller actuates the switch to prevent power from reaching the device. In cases where the device is a stove, killing the power may prevent a fire from developing or from spreading further.

The microphone may also be configured to listen for user speech. For example, the microphone may detect a user's voice, and the processor may be configured to interpret the voice and determine whether a voice command has been issued by the user. As such, the processor allows the user to control the electronic device using voice commands. In one example, a user may be able to speak a voice command to shut off the device and the processor will communicate with the controller causing the device to be turned off. Still further, in cases where the electronic device has a communications module, the communications module may receive a voice command over a wired or wireless communication means and control the device according to the command.

The electronic device may also have a speaker built into it that provides audible notifications to users. For instance, the speaker may provide an audible notification indicating that the device has been on for over an hour or for over three hours and query whether the device is to be turned off. The speaker may also be used in conjunction with the microphone that detects smoke alarm signals. In such cases, the speaker may audibly warn residents that the stove has been left on, in lieu of or in addition to any textual notifications that are sent out by the electronic device's communications module.

Various embodiments of an electrical device are shown below. In some embodiments, the electrical device 100 of FIGS. 1-10 may include some or all of the following components depicted in the system architecture diagram 1100 of FIG. 11: a microphone 1109 configured to listen for an audible input 1110 (e.g. an alarm signal), a communications module 1104 configured to send notifications 1107 to users 1105 regarding use of an electrical device 1115 and to receive indications from users regarding management of the electrical device, a switch 1111 that cuts off or allows power to the electrical device, an electronic controller 1112 that controls the switch to cut off or allow power to the electrical device, and a processor 1102 and memory 1103 configured to analyze input signals 1110 and determine when to indicate to the electronic controller that the electrical device 1115 is to be turned off.

Figure 2:
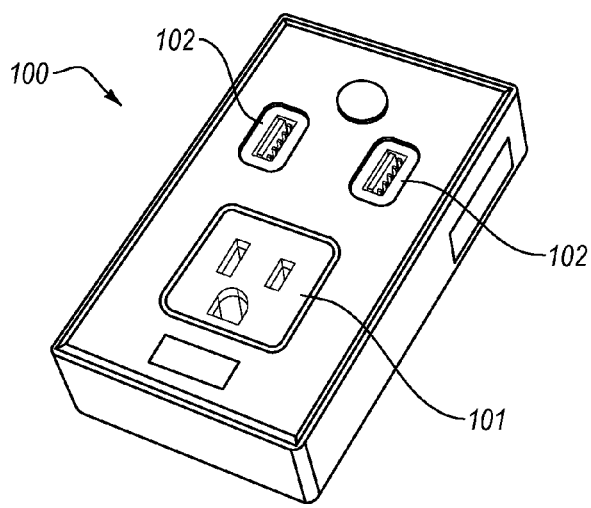
FIG. 2 illustrates the electronic device of FIG. 1, but from a rotated, perspective view.
Figure 3:
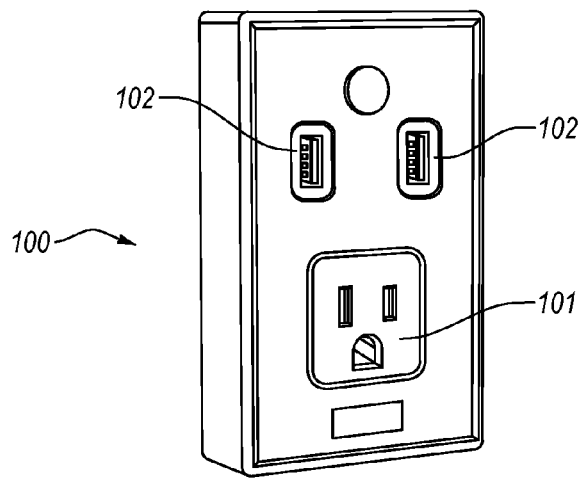
FIG. 3 illustrates the electronic device of FIG. 1, but from an alternative rotated, perspective view.
Figure 4:
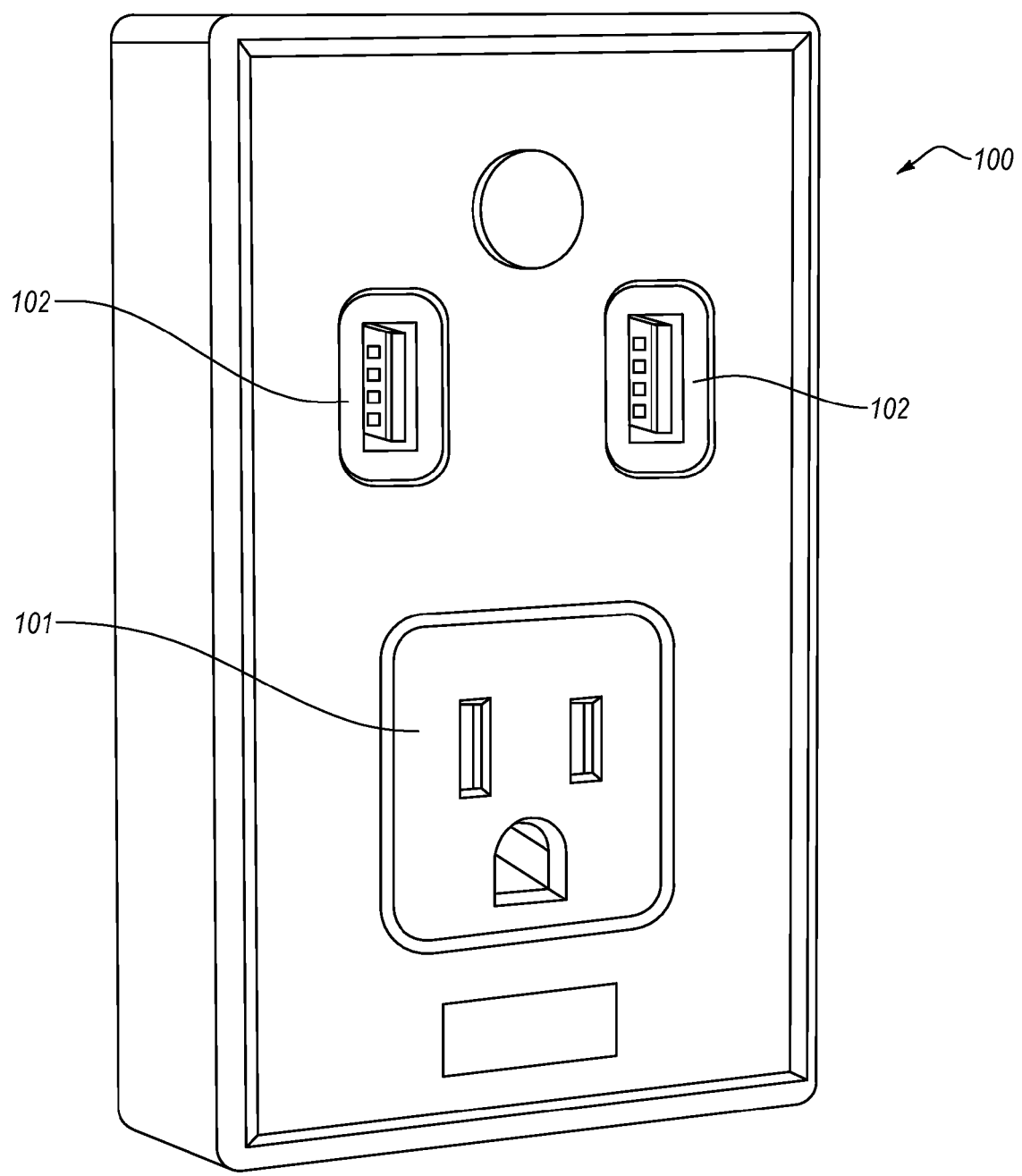
FIG. 4 illustrates a zoomed-in view of the electronic device of FIG. 1.

The device 100 of FIG. 1 (e.g. device 1101 of FIG. 11) further includes a power outlet 101 plug into which the device 1115 is plugged. The device 100 also includes two USB ports 102. Other power or data connections may also be added to the device 100. FIG. 2 illustrates the electrical device 100 of FIG. 1, but from a rotated, perspective view. FIG. 3 illustrates the electrical device 100 of FIG. 1, but from an alternative rotated, perspective view. FIG. 4 illustrates a zoomed-in view of the electrical device 100 of FIG. 1.

Figure 5:
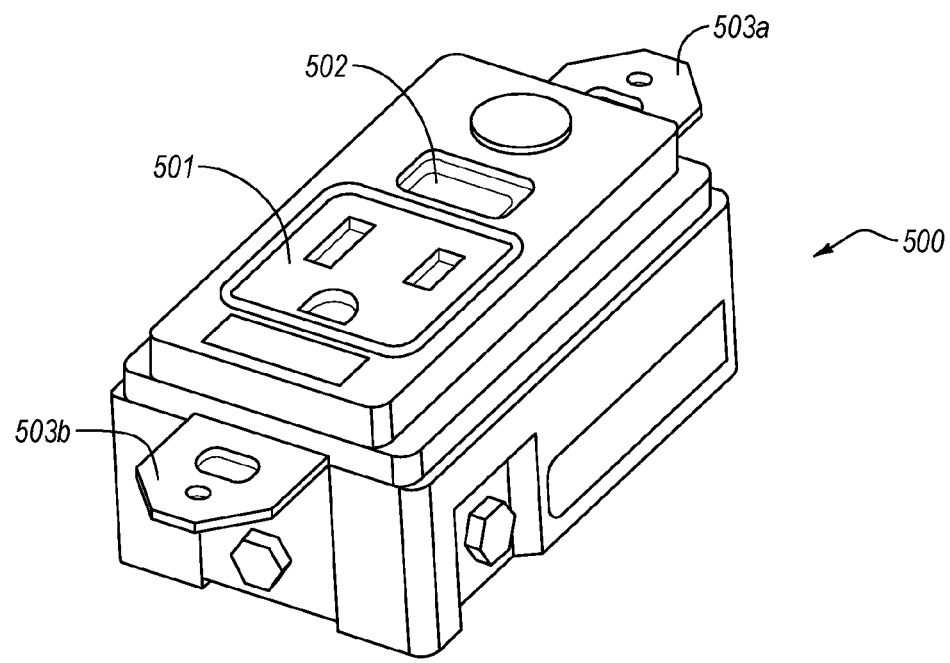
FIG. 5 illustrates a perspective view of an alternative electronic device that is configured to remotely manage electrical devices.

FIG. 5 illustrates a different embodiment of an electrical device 500. Like the device 100 illustrated in FIGS. 1-4 and shown schematically in FIG. 11, the electrical device 500 of FIG. 5 may include a microphone 1109 that listens for an alarm signal 1110, a communications module 1104 that sends notifications 1107 to users 1105 regarding use of an electrical device 1115. These notifications 1107 may be read by the user 1105 on his or her smartphone or other mobile device 1106. The electronic device 1101 also receives indications 1108 from users 1105 regarding management of the electrical device 1115.

The electronic device 500 further includes a switch 1111 that cuts off or allows power to the electrical device, an electronic controller 1112 that controls the switch to cut off or allow power 1114 to the electrical device 1115, and/or a processor 1102 and memory 1103 configured to analyze input signals 1110 and determine when to indicate to the electronic controller that the electrical device 1115 is to be turned off. The device 500 of FIG. 5 further includes an electrical outlet plug 501 and a USB plug 502, as well as mounting brackets 503a and 503b on the top and bottom ends, respectively.

Figure 6:
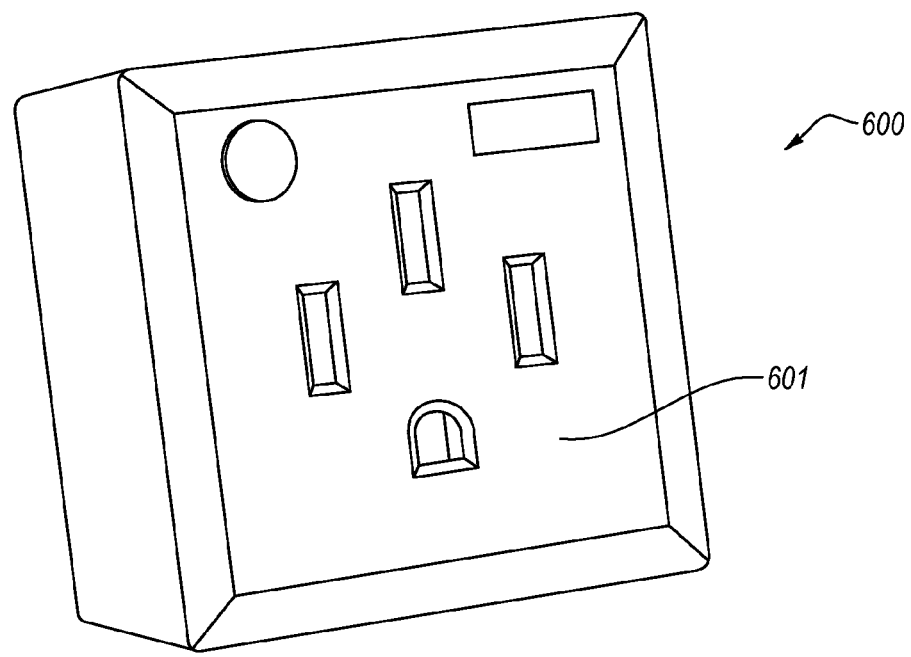
FIG. 6 illustrates a perspective view of an alternative electronic device that is configured to remotely manage electrical devices.
Figure 11:
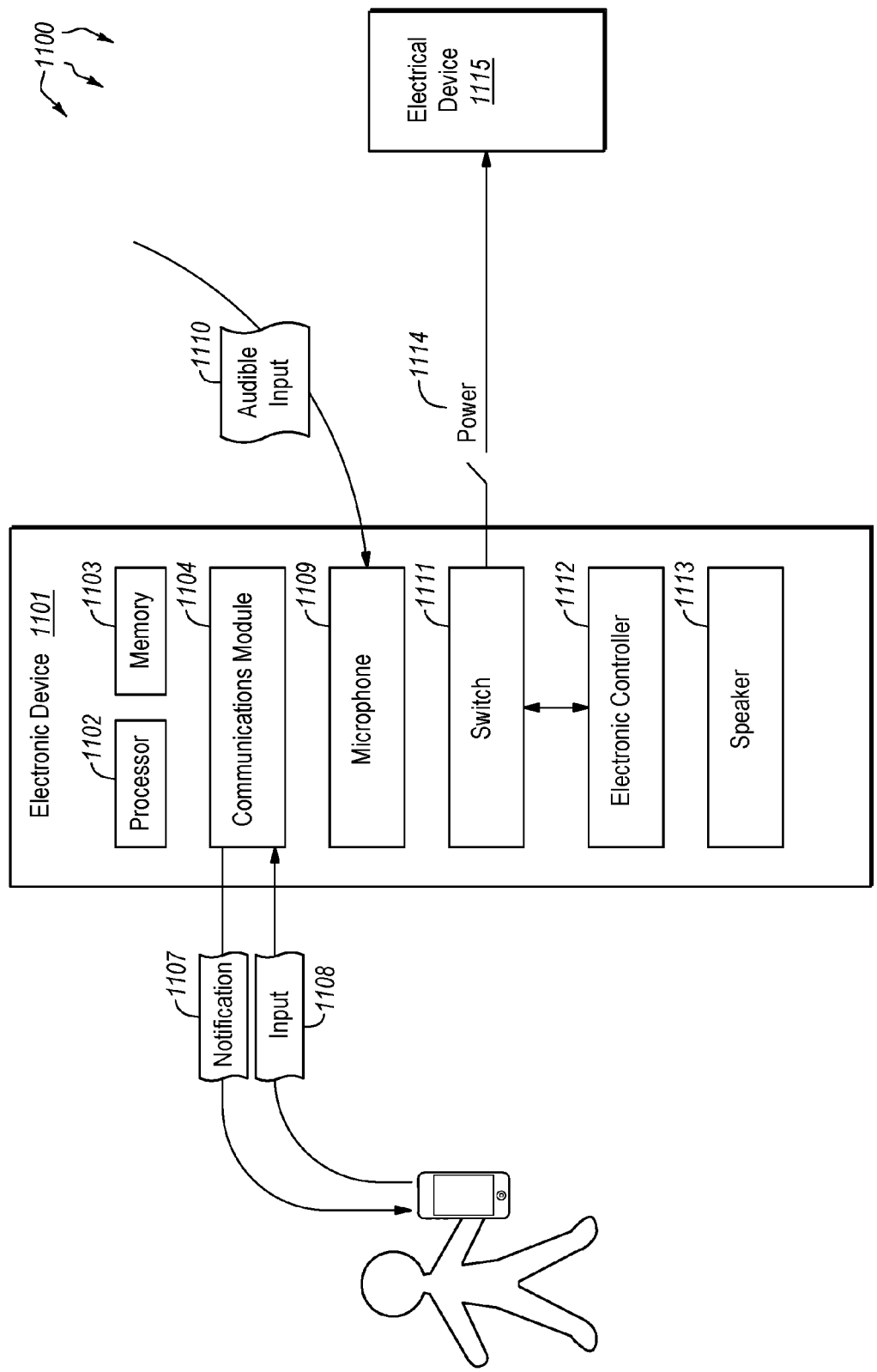
FIG. 11 illustrates a computer architecture in which embodiments described herein may operate including remotely managing electrical devices.

FIG. 6 illustrates another embodiment of an electrical device 600. Like the embodiments described above, the electrical device 600 of FIG. 6 (and as schematically shown in FIG. 11, may include a microphone 1109 that listens for an alarm signal 1110. The device 600 also includes a communications module 1104 that sends notifications 1107 to users 1105 regarding use of an electrical device 1115, and receives indications 1108 from users regarding management of the electrical device. The device 600 further includes a switch 1111 that cuts off or allows power 1114 to the electrical device 1115, an electronic controller 1112 that controls the switch to cut off or allow power 1114 to the electrical device 1115, and/or a processor 1102 and memory 1103 configured to analyze input signals 1110 and determine when to indicate to the electronic controller that the electrical device is to be turned off. The device 600 of FIG. 6 also includes an electrical outlet plug 601 for receiving high voltage devices (e.g. dryers, machinery or other 220V loads).

Figure 7:
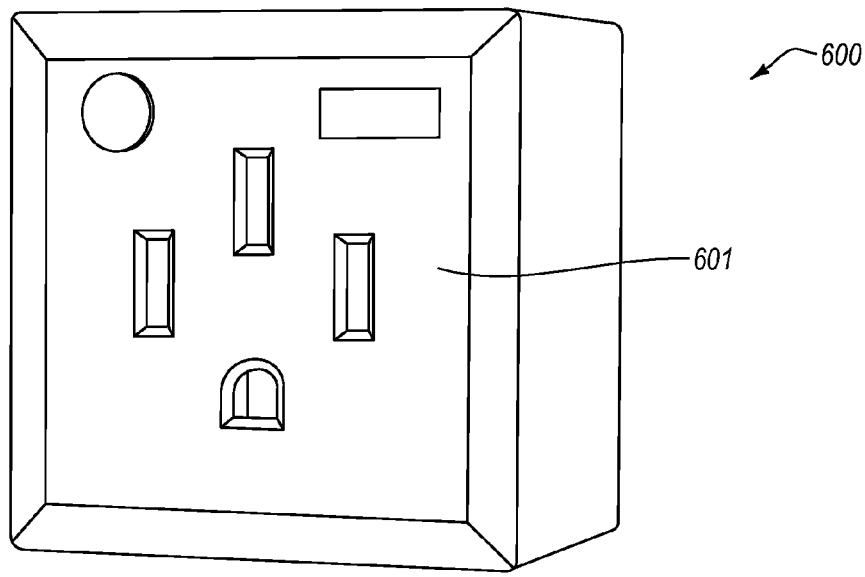
FIG. 7 illustrates the electronic device of FIG. 6, but from a rotated perspective view.
Figure 8:
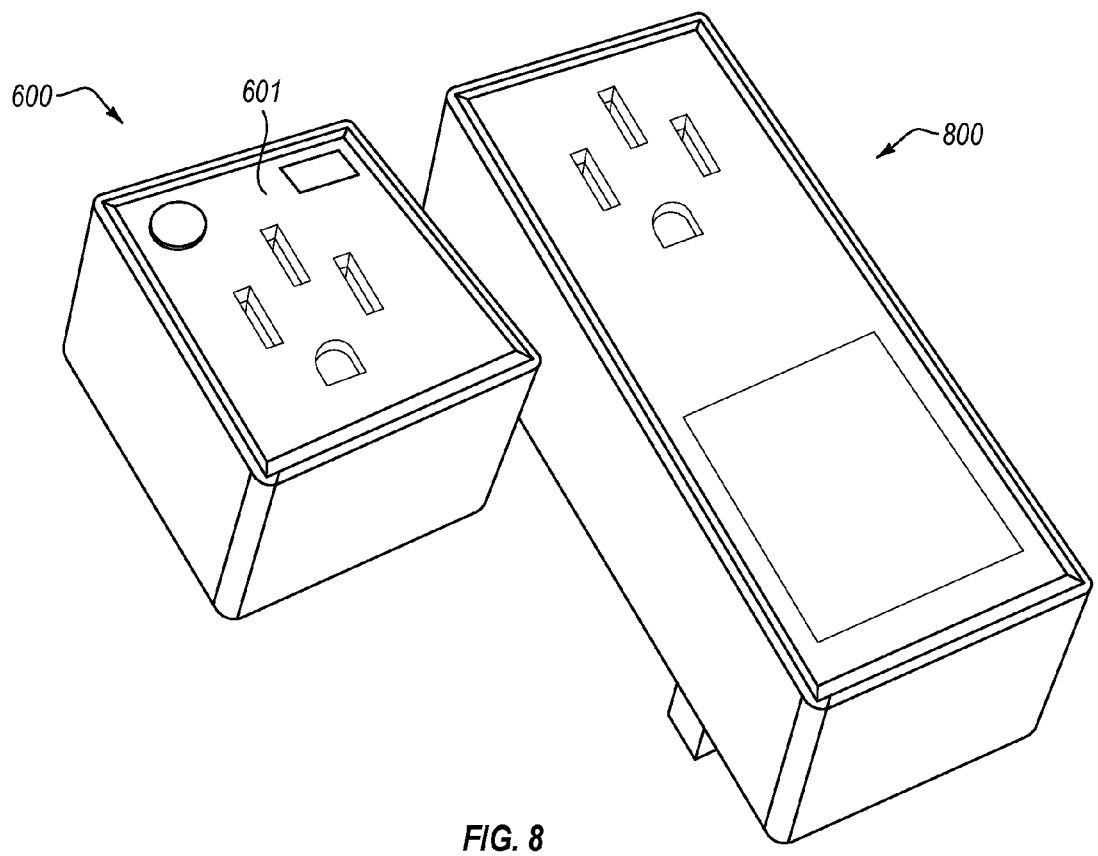
FIG. 8 illustrates the electronic device of FIG. 6 alongside another electronic device for remotely managing electrical devices.

FIG. 7 illustrates the electrical device 600 of FIG. 6, but from a rotated, perspective view. FIG. 8 illustrates the electrical device 600 of FIG. 6 alongside another electrical device 800. In some embodiments, the electrical device 600 in FIG. 8 omits some of the functional elements that may be included in the electrical device 800 of FIG. 8, including any one or more of the following internal components: a microphone that listens for an alarm signal, a communications module that sends notifications to users regarding use of an electrical device and receives indications from users regarding management of the electrical device, a switch that cuts off or allows power to the electrical device, an electronic controller that controls the switch to cut off or allow power to the electrical device, and/or a processor configured to analyze input signals and determine when to indicate to the electronic controller that the electrical device is to be turned off.

Figure 9:
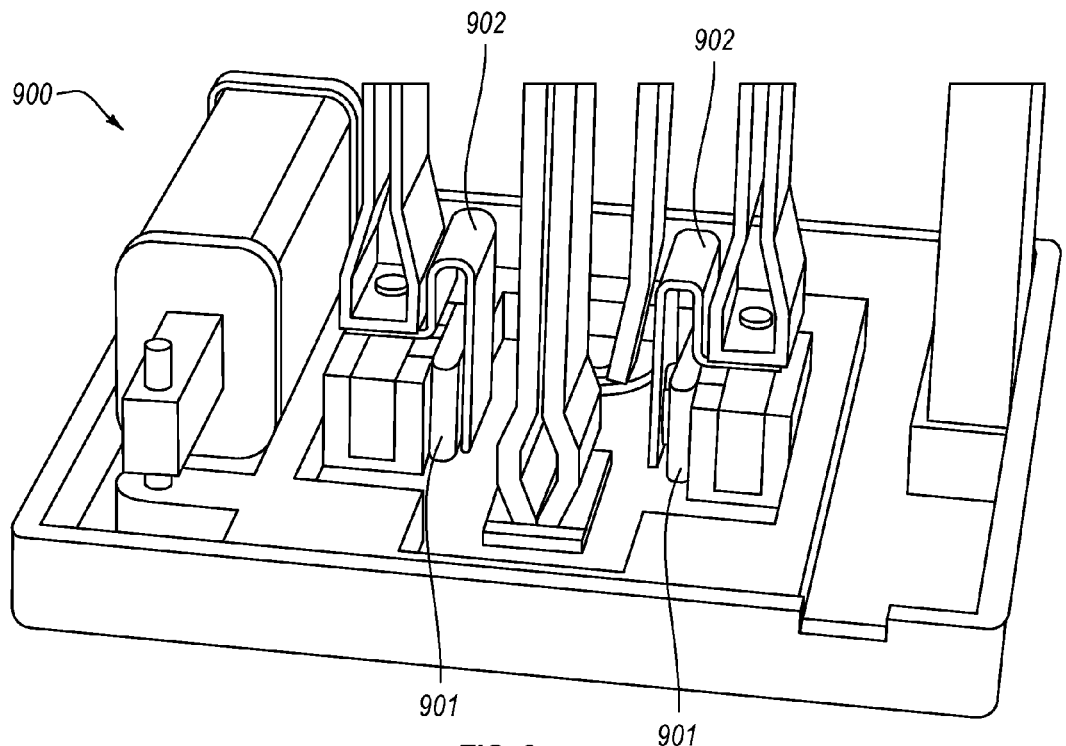
FIG. 9 illustrates a switch of an electronic device, such as that shown in FIG. 1, in the off position.
Figure 10:
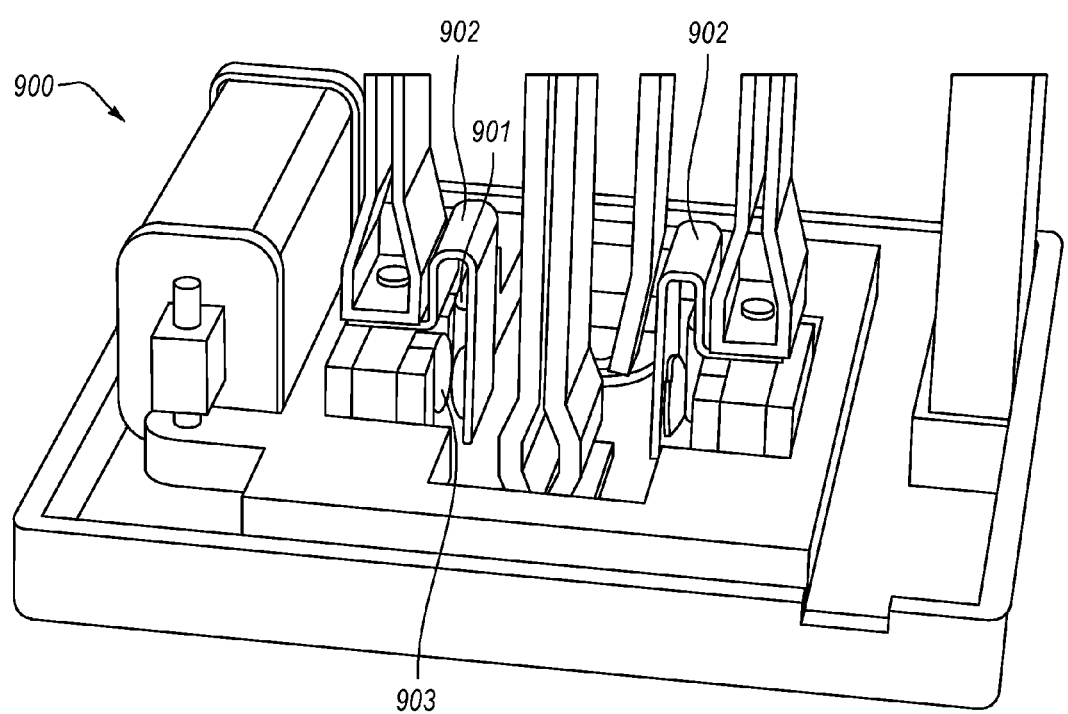
FIG. 10 illustrates a switch of an electronic device, such as that shown in FIG. 1, in the on position.

FIGS. 9 and 10 illustrate a switch of an electrical device such as 100 of FIG. 1 or 600 of FIG. 6. In FIG. 9, the switch 901 is in the off position, and the contacts 902 of the device 900 are not electrically connected. Whereas, in FIG. 10, the switch 901 is in the on position, as the contacts 902 of the device 900 are electrically connected to the contacts 903 of the switch 901. It will be understood that the embodiments shown in FIGS. 1-10 are merely examples of electrical devices that may be implemented to remotely manage other electrical devices.

As mentioned above, FIG. 11 shows a schematic diagram of an electronic device 1101 that may be used to remotely manage devices. This device may appear as device 100, 500, 600 or 900, or may appear differently altogether. The electronic device 1101 includes a microphone 1109 configured to listen for an alarm signal 1110. The electronic device 1101 also includes a communications module 1104 configured to send notifications 1107 to users 1105 regarding use of an electrical device 1115, and receive indications 1108 from users regarding management of the electrical device. The electronic device 1101 further includes a switch 1111 that connects or disconnects power 1114 to the electrical device 1115, an electronic controller 1112 that controls the switch

1111 to connect or disconnect power to the electrical device, and a processor 1102 configured to analyze input signals and determine when to indicate to the electronic controller 1112 that the electrical device 1115 is to be turned off.

In some cases, the electronic device also includes one or more speakers 1113. The speaker(s) may be configured to provide audible notifications to users. For instance, the speaker 1113 may project an audible notification to user 1105 indicating that an electrical device 1115 has been left on and should be turned off. The microphone 1109 may be configured to listen for user speech from users that are in the surrounding area of the device 1101. The processor 1102 of the device 1101 allows the user to control the electronic device using voice commands. The user's voice is interpreted and processed by the processor 1102 using one or more speech recognition algorithms.

In some cases, where the microphone is configured to listen for an alarm signal, the alarm signal may indicate that the alarm is in a specific state. For instance, the alarm may indicate that it is in a low battery state, or it may indicate that it has been partially or entirely removed from its place of installation. In such instances, battery power may be used to power the communication. The alarm or other device may communicate with local wireless networks using WiFi, Bluetooth, Z-wave or other wireless protocols. The alarm or other device may have a sensor, or may be able to detect via a shunt between the alarm's wiring connection that the alarm is low on battery or has been removed. In such cases, the electronic device 1101 may listen for and hear such communication (if audible), or may receive the communication over a wireless data transfer. If the electronic device 1101 determines that an alarm has been removed or is in a low battery state or other state that requires attention, the communications module 1104 sends a notification to at least one user 1105 notifying the user that the alarm has been removed.

Figure 12:
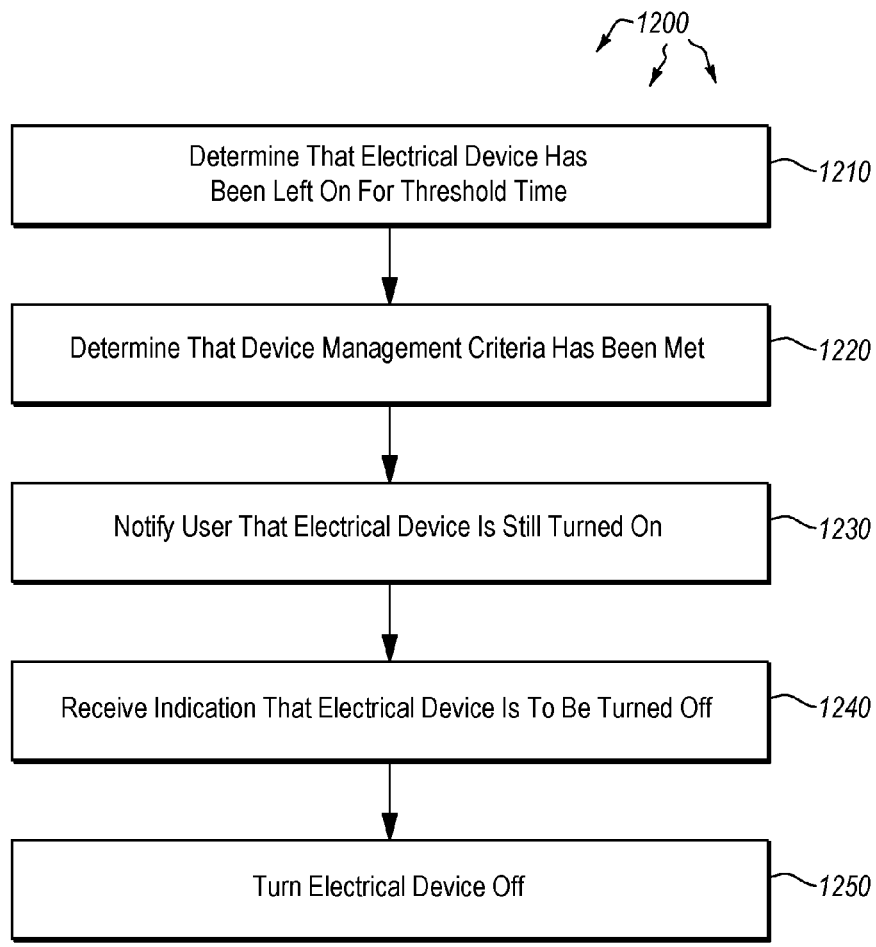
FIG. 12 illustrates a flowchart of an example method for remotely managing electrical devices.
Figure 13:
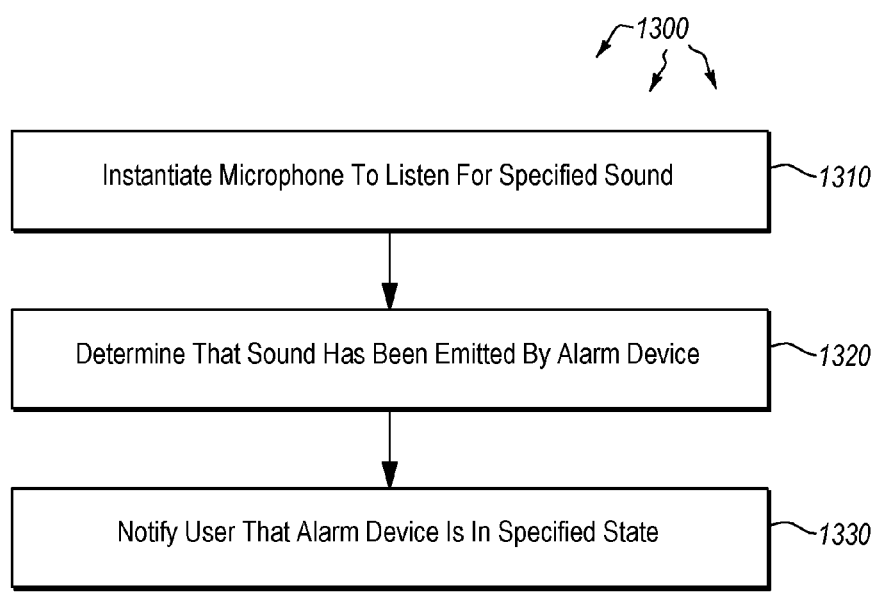
FIG. 13 illustrates a flowchart of an example method for determining the state of an alarm device.

In view of the systems and architectures described above, methodologies that may be implemented in accordance with the disclosed subject matter will be better appreciated with reference to the flow charts of FIGS. 12 and 13. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 12 illustrates a flowchart of a method 1200 for remotely managing electrical devices. The method 1200 will now be described with frequent reference to the components and data of environment 1100.

Method 1200 includes determining that at least one electrical device has been left turned on for a threshold minimum period of time (1210). Processor 1102 may work, in conjunction with memory 1103 and communications module 1104, to determine that electrical device 1115 has been left turned on for a threshold minimum period of time (e.g. 45 min. for a stove, or 2 hours for an oven). This amount of time may be a default time, or may be a user selected time.

Method 1200 also includes determining that at least a first device management criteria has been met indicating that the electrical device 1115 is no longer being actively managed (1220). The device management criteria may be indicators that show the likelihood that the user 1105 is actively managing the electrical device 1115. The indicators may be from home security presence sensors that determine whether persons are in the home, or from a beacon that establishes a geofence, or other sensors that indicate the presence of a user in a room or other location. The indicators may indicate that the user is in the general proximity of the electrical device, and an assumption may be made that the device is being managed. If the indicators indicate that the user is not in the proximity of the electrical device, or has lain down to take a nap or is otherwise disengaged, the device management criteria may be met, and the electronic device 1101 may be activated to remotely manage the electrical device 1115.

Once the device management criteria have been met, method 1200 includes notifying at least one user 1105 that the electrical device 1115 is still turned on (1230). For example, the communications module 1104 may send a notification 1107 to user 1105 indicating that the device 1115 is still turned on. The user 1105 may provide input 1108 indicating that the electrical device 1115 is to be turned off, and this input may be received by the communications module in step 1240. Method 1200 then includes turning the electrical device 1115 off (1250). This may be accomplished by having the electronic controller 1112 send a signal to the switch 1111 that power (or another utility) is to be turned off.

The electronic device 1101 may use its microphone to listen for audible input 1110 such as that from a fire alarm. The fire alarm may be connected (either wired or wirelessly) to the cloud, to a phone, or to any other device. The fire alarm may communicate audibly (such as by beeping or sounding an audible alarm), or may communicate electronically through wired or wireless communication means. In some cases, the fire alarm may communicate with the electronic device 1101 and or any other home automation equipment using Z-waves, Bluetooth, WiFi, cellular networks or other wireless networks. Indeed, the communications may be performed using substantially any wired or wireless protocol, and are thus protocol agnostic.

In some cases, as explained above, determining that the user 1105 has left his or her electrical device unattended includes determining that he or she has left the home. This may include determining that the user is outside of an established geofence. The geofence may be of varying size for different users, and may change dynamically depending on who is home at the time. For instance, the geofence may be smaller for very young and very old users, and may be bigger for middle-aged users. Determining that the user is outside of an established geofence may include determining that an electronic device 1106 associated with the user 1105 is at least a specified distance away from the electrical device 1115. Determining that a user is taking a nap may be made based on info from a home security system or based on history data (e.g. the user usually takes an afternoon nap). If such a determination is made, the electronic device 1101 may beep and/or send the user a message 1107.

In some cases, the notification 1107 may be sent upon determining that the user is outside of the established geofence for a specified minimum period of time. Thus, for example, if the user is outside of the geofence for at least 10 minutes, a notification will be sent to the user and/or other designated recipients. Once the electronic device 1101 has determined to turn the electrical device off, a signal may be sent to the electrical controller 1112 to disconnect power from the electrical device 1115. If the electrical controller is electrically connected to a breaker box, it may be configured to shut off power to the electrical device at the breaker box, or using switch 1111.

A beacon may be used to monitor the user's location and determine when the user is outside of a specified area. Such a determination may indicate that the user is no longer actively managing the electrical device 1115. Another way of determining that a device management criteria has been met indicating that the electrical device is no longer being actively managed includes determining that an electronic device 1106 associated with the user 1105 has been stationary for a specified amount of time, indicating that the user is potentially asleep or is watching tv and has forgotten about the electronic device. The electronic device 1101 may also actively monitor the length of time that the electrical device is turned on, and may notify one or more users that the electrical device has been turned on for a specified amount of time (such as with a gaming console).

Notifications sent out by the electronic device 1101 may be sent to one specified user 1105 or may be sent to multiple users. Indeed, notifications may be sent to different groups of users depending on which type of notification is issued. In some cases, the notification may query whether the user wants to turn the device off and, if so, accomplishes such remotely. Alternatively, the notification 1107 may simply indicate that a smoke alarm signal was detected, for example, and that the electrical device 1115 was turned off automatically to mitigate any potential problems. In cases where utilities are shut off (or otherwise managed) by the electronic device 1101, those utilities may be shut down or managed at the point of use or at the main itself. For example, a valve may be placed in line with a gas line. The valve may be powered and may be controlled via the electronic controller 1112 and/or switch 1111.

For instance, in one embodiment, an inline normally closed gas valve may be used that is powered by a USB cable or equivalent power supply. This power supply may be one shown in FIGS. 1-10, which may include the elements shown in FIG. 11. The power supply may keep the valve open during normal operation, and monitor gas, water or electricity flow using a flow sensor. When a stove or other device is on and gas is flowing, if the smoke alarm goes off, the electronic device 1101 will cut power to the gas valve and the gas valve will close.

FIG. 13 illustrates a flowchart of a method 1300 for determining the state of an alarm device. The method 1300 will now be described with frequent reference to the components and data of environment 1100.

Method 1300 includes initiating a microphone to listen for a specified sound, the specified sound indicating that the alarm device is in a specified alarm state (310). For example, the electronic device 1101 may initiate microphone 1109 to listen for audible input 1110. This audible input may be a beep, chirp or alarm from a fire alarm indicating that the fire alarm is in a low battery state, or has been removed from the wall. Method 1300 then includes determining that the specified sound has been emitted by the alarm device at least once (1320), and then notifying a user that the alarm device is in the specified state, allowing the user to take action to change the state of the alarm device (1330).

Thus, if the user receives a notification on his or her mobile device 1106 indicating that the fire alarm is in a low battery state, or has been removed from the wall, the user may take action to replace the battery or see why the alarm was removed. This may be particularly useful for landlords who do not live in the home, but have an interest in ensuring that proper safety precautions such as fire alarms are installed and working. The alarm may be designed to send such a notification even if the battery is low, or even if disconnected from the wall. In some cases, if the alarm is powered via wired electricity (e.g. with a battery backup), the alarm may be equipped with a shunt or other device in the power connection so that it can determine that it has been removed from the wall. This allows the alarm to report the audible (or wireless) input to the electronic device 1101, which allows the electronic device to notify the resident of the home and/or owner of the home. This may be used to ensure that working fire alarms are in place in a greater number of homes.

Accordingly, methods, systems and computer program products are provided which allow users to remotely manage electrical devices. Moreover, electronic devices are provided which allow users to remotely manage electrical devices.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. At a computerized system including at least one processor, a computer-implemented method for remotely managing electrical devices, the method comprising:
   determining that at least one electrical device has been left turned on for a threshold minimum period of time;
   determining that at least a first device management criteria has been met indicating that the electrical device is no longer being actively managed;
   notifying at least one user that the electrical device is still turned on;
   receiving an indication that the electrical device is to be turned off; and
   turning the electrical device off, wherein turning the electrical device off comprises providing a control signal to an electrical controller that is part of the computerized system, wherein the electrical controller has a hardware switch that disconnects power at the computerized system and prevents power from reaching the electrical device.

2. The method of claim 1, wherein the first device management criteria comprises determining that the at least one user has left his or her home.

3. The method of claim 2, wherein determining that the at least one user has left his or her home comprises determining that the user is outside of an established geofence.

4. The method of claim 3, wherein determining that the user is outside of an established geofence comprises determining that an electronic device associated with the user is at least a specified distance away from the electrical device.

5. The method of claim 3, wherein the notification is sent upon determining that the user is outside of the established geofence for a specified minimum period of time.

6. The method of claim 1, wherein the method wherein the electrical controller is electrically connected to a breaker box and is configured to shut off power to the electrical device at the breaker box.

7. The method of claim 1, wherein a beacon is used to monitor the user's location and determine when the user is outside of a specified area, the determination indicating that the user is no longer actively managing the electrical device.

8. The method of claim 1, wherein determining that at least a first device management criteria has been met indicating that the electrical device is no longer being actively managed comprises determining that an electronic device associated with the user has been stationary for a specified amount of time, indicating that the user is potentially asleep.

9. The method of claim 1, further comprising:
actively monitoring the length of time that the electrical device is turned on; and
notifying the user that the electrical device has been turned on for a specified amount of time.

10. The method of claim 9, wherein the notification is sent to at least one mobile device associated with the user.

11. The method of claim 1, wherein the electrical device is turned off automatically upon hearing a smoke alarm signal.

12. At a computerized system including at least one processor, a computer-implemented method for remotely managing electrical devices, the method comprising: determining that at least one electrical device has been left turned on for a threshold minimum period of time; determining that at least a first device management criteria has been met indicating that the electrical device is no longer being actively managed, including determining that an electronic device associated with the user has been stationary for a specified amount of time, indicating that the user is potentially asleep; notifying at least one user that the electrical device is still turned on; receiving an indication that the electrical device is to be turned off; and turning the electrical device off.

* * * * *